R. M. LOVEJOY.
SHOCK ABSORBER.
APPLICATION FILED NOV. 10, 1913.
1,164,371. Patented Dec. 14, 1915.
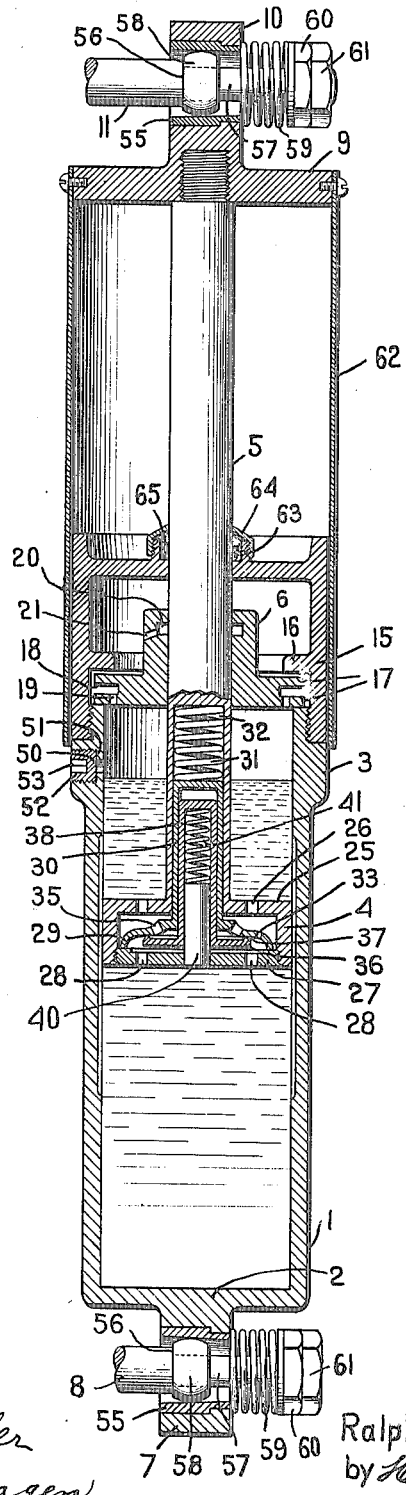
Witnesses.
J. Morrill Fuller
William E. Gagen
Inventor.
Ralph M. Lovejoy,
by Heard Smith & Tennant
Atty's.

UNITED STATES PATENT OFFICE.

RALPH M. LOVEJOY, OF MEREDITH, NEW HAMPSHIRE.

SHOCK-ABSORBER.

1,164,371.   Specification of Letters Patent.   Patented Dec. 14, 1915.

Application filed November 10, 1913. Serial No. 800,024.

*To all whom it may concern:*

Be it known that I, RALPH M. LOVEJOY, citizen of the United States, residing at Meredith, county of Belknap, State of New Hampshire, have invented an Improvement in Shock-Absorbers, of which the following description, in connection with the accompanying drawing, is a specification, like characters on the drawing representing like parts.

This invention relates to improvements in shock absorbers and especially that type which is adapted for use upon automobiles and other vehicles which are subject to heavy jolts.

In order that the body of the vehicle may be free from substantial vibration which will annoy the passengers it is desirable that comparatively light springs be used which will yield to light shocks and that said springs be supplemented by a cushioning or shock absorbing means which is adapted to dissipate the effect of the more severe shocks due to striking large obstructions in the road or passing over deep gullies.

The present invention therefore comprises a hydraulic shock absorber which is adapted to be so arranged as to be practically inoperative during slight shocks, but which will destroy or lessen the effect of the more severe shocks. I am aware that heretofore shock absorbers of this general type have been made in which the fluid used is usually oil, but in such devices there is a great deal of leakage of the oil around the stuffing box which surrounds the piston of the hydraulic cylinders. This leakage eventually causes such diminution of the amount of oil contained in the cylinder as to interfere with the effectiveness of the shock absorber. The exuded oil collects dirt and thereby hastens the wearing away of movable parts and also by running down the exterior of the device gives it an unsightly appearance.

One of the objects of the invention is to provide a hydraulic shock absorber in which there is no necessity for a stuffing box for the piston rod, and in the present invention means have been devised whereby any oil which may leak out around the piston rod through its journal in the cylinder head will be speedily and completely returned to the cylinder.

Another object of the invention is to provide means whereby the rate of flow of the fluid through the piston head may be regulated in such a manner that the shock absorber will be responsive to severe shocks only.

Another object of the invention is to provide a valve of such a character as to permit the piston head to return readily to its normal position.

Another object of the invention is to provide a plurality of telescoping valves within the piston head proper, whereby large apertures may be provided in the piston head for the flow of the oil or other fluid through said head, said valve being so arranged as to be provided with springs of sufficient rigidity to accomplish the results above pointed out.

Another object of the invention is to provide means for attaching a shock absorber to two relatively vibrating parts, such as the axle and body of a vehicle of such a character that rattling will be avoided.

Other objects of the invention will more fully appear from the description and annexed drawing, and the following claims.

The drawing represents a vertical axial section of one of the preferred forms of apparatus in which this invention is embodied.

The shock absorber illustrated in the accompanying drawing comprises a cylinder having a body 1 and an end 2 preferably cast integral therewith and having thickened portion or ring 3 adjacent the opposite end of said body. The cylinder is provided with a piston which preferably comprises a chambered head 4 and a rod 5 cast integrally with the piston head 4. The piston rod extends through a loosely mounted and movable cylinder head 6 as will hereinafter be explained.

The end 2 of the cylinder is provided with a projection 7 which is apertured to receive a supporting member 8 attached to or extending from the axle of the vehicle. The piston rod 5 is preferably screw threaded at its end into a circular casting 9 having a boss 10 adapted to receive a member 11 projecting from or secured to the body of the vehicle.

In hydraulic shock absorbers considerable difficulty is experienced because of the tendency of the oil to leak out along the piston rod through its bearing in the cylinder head, thus lessening the supply of oil in the cylinder and eventually rendering the device ineffective. In order to maintain the shock absorbers in operative condition it has heretofore been necessary to provide a stuffing box in the cylinder head for the piston and to keep a packing screwed tightly around the piston but inasmuch as the shock absorbers are usually placed beneath the body of the vehicle in position which is difficult of access they are likely to be neglected and in the course of a short time sufficient oil will leak out to render the device useless.

In the present invention the necessity for a stuffing box or other packing gland is eliminated, and provision is made for returning whatever oil by chance oozes out around the piston rod directly to the cylinder, thereby avoiding a loss of fluid which would render the device ineffective or inoperative. This is accomplished in the embodiment of the invention disclosed herein by providing a chambered cap 15 for the end of the cylinder, which is preferably attached thereto by a screw threaded connection extending from the end of the cylinder to the edge of the thickened portion of the cylinder body 3, the cap being of substantially the same external diameter as the outer diameter of said thickened portion or ring. This cap forms an auxiliary chamber adapted to receive any oil or other fluid which may ooze out from the bearing around the piston rod.

In order to provide means whereby the oil thus escaping may return directly to the cylinder, the cylinder head 6 is independently supported between the end of the cylinder body and an annular ledge 16 projecting inwardly from the cap 15. The ledge 16 is spaced from the end of the cylinder a distance slightly greater than the thickness of the edge portion 17 of the cylinder head so that the latter is capable of a slight movement in unison with the piston during its reciprocation. The edge of the cylinder head 6 is preferably provided with an annular groove 18 which communicates with openings or apertures 19 leading into the cylinder. The cylinder head 6 may also be provided with an oil packing groove 20 to check the flow of any escaping oil, and an opening 21 leading from said groove being preferably provided to permit the oil in the groove to escape into the cap chamber whence it returns to the cylinder proper.

In the operation of the device a severe jolt will just cause the piston to descend against the resistance of the fluid in the lower part of the cylinder, which is permitted to escape through restricted openings in the piston head as will hereinafter be explained, until the shock has been dissipated. Upon the rebound or return movement the piston ascends and the movable cylinder head 6 is carried upwardly by the piston rod 5 until the upper surface of the outer portion 17 seats upon the inwardly projecting ledge 16 of the cap. The contacting surfaces of the cylinder head and the ledge 16 are so ground as to provide a tight joint which will prevent the fluid from the cylinder passing into the cap chamber. The return shock is absorbed during the further movement of the piston by the resistance of the fluid passing downwardly through the piston head in a manner hereinafter to be described. After the shock has been absorbed the piston head will descend to its normal position, and upon its descent the cylinder head 6 will move in unison with it until it seats upon the end of the cylinder body. By this movement the cylinder head will be removed from its contact with the internal ledge 16 of the cap thus providing an opening through which any oil which may have found its way into the cap chamber may run down into the groove 18 of the cylinder head, and thence through the apertures 19 into the cylinder proper. This return of the oil through the cylinder is caused not only by the action of the force of gravity, but in addition thereto by such vacuum as has been created in the cylinder by the upward movement of the piston, so that the oil or fluid in the chamber is forcibly drawn back into the cylinder body.

As before stated it is desirable that the shock absorber remain substantially unresponsive to the effect of light shocks and to accomplish this result the inner surface of the cylinder body is provided in its middle portion with a series of grooves which are adapted to permit the free passage of the fluid from one side of the piston to the other during a short reciprocation of the piston. These grooves, may, if desired, be made in graduated lengths increasing from the middle of the cylinder so that as the piston moves from its normal position the resistance to such movement will be gradually increased.

In order to make the piston effective against heavy shocks only, a valve is provided in the piston head which is retained in place by a spring of a determined resistance so that the piston head remains substantially closed against the passage of fluid through it, except when sufficient stress is presented to overcome the resistance of the spring.

In the preferred form of the invention illustrated herein, the piston head 4 is in the form of a short cylinder, the upper portion 25 of said piston head, its edges and the piston rod 5 being preferably cast integral. The upper portion 25 of the piston head is provided with apertures 26 of sufficient size to allow the fluid in the cylinder to pass freely from one side of the piston to the other. The other end of the cylindrical piston head 4 is provided with an internal disk 27 which is preferably screwed into the edge of the piston head and provided with apertures 28 adapted to permit the free flow of the fluid from one side to the other.

In order to restrict and regulate the flow of the fluid from the piston head a valve 29 is placed within the chamber in the piston head. This valve is preferably bell-shaped in form and is seated upon the disk 27 outside of the apertures 28. It is provided with a stem 30 which extends upwardly into a cylindrical recess in the piston rod, a spring 31 being interposed between the end 32 of the cylindrical recess in the piston rod and the upper end of the valve stem 30. By providing a strong spring to maintain this valve seated the shock absorber will respond only to such shocks as will overcome the resistance of the spring 31. Upon such shocks the bell-shaped valve 29 will be raised from its seat and the fluid allowed to escape from the lower to the upper part of the cylinder through the ports 26 and 28 in the piston heads as the piston descends. By reason of the large area of the valve 29 the initial flow of oil through the cylinder head upon a severe shock will be relatively great permitting the piston at first to descend rapidly, but as the energy of the shock becomes absorbed by the resistance of the fluid passing through the ports in the piston head, the spring will gradually force the valve 29 toward its seat thus increasing the resistance to the passage of the fluid through the piston head until the valve is seated and the piston head gradually comes to rest.

The spring 31 may, of course, be made of such strength as may be desired to give the proper degree of sensitiveness to the shock absorber according to the conditions under which it is to be used.

The valve 29 is preferably provided with a small port 33 through which the fluid may flow during a slow movement of the piston.

It is desirable that the piston head return readily to its normal position after having performed its function of absorbing a shock and in order to effect this result the bell-shaped valve 29 is provided with a series of ports 35 which are adapted to be closed by a valve located within said bell-shaped valve. This valve as illustrated in the drawing herein comprises a disk 36 adapted to seat upon the under surface of a horizontal portion 37 of the bell-shaped valve. The disk valve is provided with a hollow stem which is adapted to fit and extend upwardly into the stem 30 of the bell-shaped valve. The disk 27 is preferably provided with a stud 40 which projects upwardly and fits within the hollow stem 38 of the valve 36. A spring 41 is interposed between the upper end of the stud 40 and the under part of the end of the stem 38. The spring serves to retain the valve 36 normally against the seat 37.

It will be obvious that in operation the downward movement of the piston will tend to hold the valve against its seat 37. Upon the backward or upward movement of the piston, however, the valve 36 will be withdrawn from its seat by the pressure of the fluid against its upper surface, and inasmuch as the spring 41 is relatively weak the fluid will readily flow from the upper portion of the cylinder to the lower, through the ports 26 in the upper portion 25 of the cylinder head, the ports 35 in the bell-shaped valve and the ports 28 in the lower portion or disk of the piston head.

Inasmuch as shock absorbers of necessity must be subject to considerable strain and often receive unexpected and very heavy shocks it is necessary that some means be provided whereby an excessive shock will not break the cylinder. In the present case provision is made against such accident by leaving a short air space at the top of the cylinder adjacent to the upper cylinder head, and in order that the user will be prevented from filling the shock absorber too full of fluid the aperture through which the fluid may be introduced into the cylinder is placed a short distance below the upper end of the cylinder body.

In the apparatus illustrated herein a hole 50 is bored through the thickened portion 3 of the cylinder body and the outer portion of said aperture enlarged to form a screw threaded seat 51 into which a plug 52 may be screwed to close said aperture. The plug 52 is preferably provided with a square recess 53 adapted to receive a suitable tool to remove and replace said plug.

In order that the shock absorber may be noiseless I have devised means which will retain its connection to the relatively vibrating members, such as the axle of the automobile and the body of the vehicle, in constant engagement. In the embodiment of the invention shown herein the stud or projection 7 from the cylinder head 2 and the extension 10 from circular support 9 for the end of the piston rod are apertured and the apertures are provided with tapered steel bushings 55. The members 8 and 11 which are attached respectively to the axle and carriage body are turned down and shouldered as at 56 to form stems 57 for the reception of suitable metallic wearing rings 58 having spherical surfaces engaging the bushings. These wearing rings 58 are preferably of a softer material than the steel bushings aforesaid, so that the rings will wear without injury to the bushings. In order to advance the wearing rings into the tapered bushings as said rings wear, the studs 57 are preferably provided with helical springs 59 which bear rigidly at one end against the face of the apertured projections and are provided at the other ends with pairs of set nuts 60, 61 through which any desired degree of compression may be applied to the springs 59.

The coiled springs 59 may be seated in countersunk recesses in the studs 7 and 10 and the length of the springs should be such that if the spring should collapse or break the wearing rings 58 will not be withdrawn entirely from the apertures.

The circular supporting member 9 which is attached to the upper end of the piston rod is preferably provided with a downwardly extending apron 62 which surrounds and embraces the upper end of the cylinder cap 15 and which prevents the access of dust to the piston rod 5.

In order to further protect the piston rod against fine dust I have provided the upper portion of the cap 15 with an annular projection 63 which is screw-threaded upon its outer side and provided with a cap 64 adapted to inclose a small amount of felt or other packing 65. It is to be understood that the function of this felt packing is merely to prevent dust from adhering to the piston stem and thereby being drawn into the cap chamber, but that it does not serve as the stuffing box in any sense.

It is to be understood that the construction disclosed herein is one of the preferred forms of my invention but that it may be embodied in various other forms and that the disclosure herein is illustrative and not restrictive.

Having thus described my invention, what I claim as new and desire to secure by Letters Patent is:

1. A shock absorber comprising a hydraulic cylinder containing a quantity of liquid, a reciprocable piston submerged in said liquid and having a piston rod extending through a bearing in the cylinder head and means actuated by the piston in its stroke in one direction for permitting the return of any liquid which has leaked through the bearing for the piston rod during the motion of the piston in the opposite direction, whereby the necessity of a stuffing box for the cylinder is eliminated.

2. A shock absorber comprising a hydraulic cylinder containing a quantity of liquid, a movable head therefor, a piston submerged in the liquid in said cylinder and having a piston rod extending through a bearing in said cylinder head, a supplementary chamber inclosing said piston head and means carried by said head adapted to prevent oil from passing from the cylinder during the movement of the piston in one direction and to permit the return of fluid to the cylinder during the movement of the piston in the opposite direction whereby any leakage along the piston rod is returned to the cylinder and the necessity of a stuffing box avoided.

3. A shock absorber having a hydraulic cylinder, and piston and a yieldable cylinder head through which the piston rod extends, a seat for said head adapted to prevent the passage of fluid from said cylinder when the piston rod is moved in one direction, and means operated upon the opposite stroke of the piston to cause the return to the cylinder of any fluid which may have leaked out during the first-mentioned movement.

4. A shock absorber comprising a hydraulic cylinder and piston, a cylinder head adapted to move slightly in unison with the piston, seats for said cylinder head adapted to prevent the passage of fluid from the cylinder when the piston is moved in one direction and to permit the return of leakage to the cylinder upon movement of the piston in the opposite direction.

5. A shock absorber comprising a hydraulic cylinder and piston, a supplementary chamber inclosing the cylinder head through which the piston rod extends, a ledge projecting inwardly from the wall of said supplementary chamber to form a seat for the upper surface of said cylinder head, and to limit the movement thereof relative to the end of the cylinder, recesses in the periphery of the cylinder head adapted to communicate with the cylinder through the under surface of said cylinder head, whereby the passage of fluid from the cylinder is prevented when the piston is moved upwardly and the return to the cylinder of leakage permitted when the piston is moved downwardly to normal position.

6. In a shock absorber comprising a hydraulic cylinder, a reciprocable piston provided with apertures to permit the flow of fluid from one side of said piston to the other, a spring actuated valve adapted to restrain the flow of fluid in one direction and a supplemental spring actuated valve wholly inclosed within said first-mentioned valve adapted to control the flow of fluid through said piston in the opposite direction.

7. In a shock absorber comprising a hydraulic cylinder, a piston provided with apertures to permit the flow of fluid from one side of said piston to the other, a valve adapted to substantially close said apertures against the upward passage of fluid provided with a relatively stiff spring whereby the cushioning effect of the device will be operative only under heavy shocks and an oppositely disposed valve provided with a relatively light spring adapted to permit the fluid to flow readily through said piston upon its return to normal position.

8. In a shock absorber comprising a hydraulic cylinder a piston having a cylindrical chambered head and a rod having a recess communicating with the chamber in said head, apertures through the ends of the piston head, a valve inclosed in said chamber and seated on one of said ends having a stem extending into the recess in said cylinder rod, a spring supported in said recess adapted to normally seat said valve and to limit the same to movement upon relatively severe shocks, substantially as described.

9. In a shock absorber comprising a hydraulic cylinder, a piston having a chambered head and a rod having a recess communicating with the chamber in said head, apertures in the ends of the piston head, a valve provided with an aperture interposed in said chamber and seated on one of said ends and having a stem extending into the recess in the cylinder rod, a spring supported in said recess adapted to normally seat said valve and to limit the same to movement upon relatively severe shocks, and a reversely operating valve normally closing the aperture in first-mentioned valve but adapted to open to permit the piston to return to normal position.

10. In a shock absorber comprising a hydraulic cylinder, a piston having a chambered head and a rod having a recess communicating with the chamber in said head, apertures in the ends of the piston head, a valve provided with an aperture interposed in said chamber and seated on one of said ends and having a stem extending into the recess in the cylinder rod, a spring supported in said recess adapted to normally seat said valve and to limit the same to movement upon relatively severe shocks, and a reversely operating spring-actuated valve normally closing the aperture in first-mentioned valve but adapted to open to permit the piston to return to normal position.

11. In a shock absorber comprising a hydraulic cylinder, a piston having a chambered head and a rod having a recess communicating with the chamber in said head, apertures in the ends of the piston head, a valve provided with an aperture interposed in said chamber and seated on one of said ends and having a stem extending into the recess in the cylinder rod, a spring supported in said recess adapted to normally seat said valve and to limit the same to movement upon relatively severe shocks, a reversely operating valve having a hollow stem, a stud projecting from the lower piston head into said hollow stem, a spring interposed between the end of said stud and the end of the recess in said valve adapted to normally seat the inner valve upon the under surface of said first-mentioned valve but adapted to yield to permit the piston to return to normal position.

12. In a shock absorber comprising a hydraulic cylinder, an apertured piston and means for regulating the passage of fluid through said piston, a piston rod, a supporting member connected to the outer end of said piston rod, a dust guard secured to said supporting member and depending therefrom to inclose said piston rod and cylinder to protect the relatively moving parts and to prevent dust from obtaining access to the fluid chamber and means operable by the reciprocation of the piston to cause any oil which leaks through the piston rod bearing to be returned to the cylinder.

In testimony whereof, I have signed my name to this specification, in the presence of two subscribing witnesses.

RALPH M. LOVEJOY.

Witnesses:
  FREDERICK A. TENNANT,
  THOMAS J. DRUMMOND.